US006620275B1

(12) United States Patent
Avila et al.

(10) Patent No.: US 6,620,275 B1
(45) Date of Patent: Sep. 16, 2003

(54) LAMINATED RESEALABLE BOOKLETS ON LABELS AND RELATED METHODS OF MANUFACTURE

(75) Inventors: Joel Avila, La Mirada, CA (US); Andrew Vale, Manhattan Beach, CA (US)

(73) Assignee: Edwards Associates Communications, Inc., Ventura, CA (US)

( * ) Notice: Subject to any disclaimer, the term of this patent is extended or adjusted under 35 U.S.C. 154(b) by 507 days.

(21) Appl. No.: 09/598,965

(22) Filed: Jun. 21, 2000

(51) Int. Cl.[7] ................................................ B32B 31/00

(52) U.S. Cl. ....................... 156/152; 156/248; 156/249; 156/253; 156/257; 156/265; 156/268; 156/270; 156/289; 156/301; 156/302; 156/292; 156/290

(58) Field of Search ................................ 156/252, 253, 156/257, 264, 265, 268, 270, 271, 152, 248, 249, 289, 290, 292, 301, 302; 283/70, 81, 94, 101, 105, 106, 107; 40/299.01, 625, 660; 101/483; 427/286

(56) References Cited

U.S. PATENT DOCUMENTS

| | | | | |
|---|---|---|---|---|
| 5,399,403 A | | 3/1995 | Instance | 428/40 |
| 5,700,537 A | | 12/1997 | Instance | 428/41.9 |
| 5,944,357 A | | 8/1999 | Instance | 283/101 |
| 6,364,990 B1 | * | 4/2002 | Grosskopf et al. | 156/268 |
| 6,413,345 B1 | * | 7/2002 | Treleaven | 156/227 |
| 6,413,604 B1 | | 7/2002 | Matthews et al. | 428/40.1 |
| 2002/0056514 A1 | * | 5/2002 | Grosskopf et al. | 156/268 |

* cited by examiner

*Primary Examiner*—Linda L Gray
(74) *Attorney, Agent, or Firm*—Greer, Burns & Crain, Ltd.

(57) ABSTRACT

Laminated resealable booklets on labels having an unadhered pull tab are made on a label press or the like by separating release material from label material in a web of label stock, neutralizing the adhesive on the label material in predetermined locations, and adhering the active adhesive on the label material to the release material. A succession of initial bases are die cut, and the resulting waste matrix is removed. Booklets are then laminated over a portion of the initial bases, and of course the laminate also covers the spaces between adjacent initial bases. The laminate and initial bases are then die cut to form the label products. Each label product includes a booklet, a base label portion of the initial base which the booklet covers, and a portion of the adjacent initial base which is not adhered to the release liner. The unadhered portion of the adjacent initial base forms the pull tab.

3 Claims, 6 Drawing Sheets

LAMINATED RESEALABLE BOOKLETS ON LABELS AND RELATED METHODS OF MANUFACTURE

FIELD OF THE INVENTION

This invention relates to self-adhesive labels, and more particularly, to methods for making laminated resealable booklet on label products.

BACKGROUND OF THE INVENTION

Laminated resealable booklet labels are available in a variety of configurations, such as the designs described in Instance U.S. Pat. No. 4,944,357. The Instance '357 patent discloses several resealable booklet label designs which are made in succession on a web of release material for later application onto containers. Two of the designs have a base label and a tab portion. The tab portion is lifted from the container to open the booklet. In one design, the tab portion for one product is taken from a support piece for an adjacent product on the web. This does not require special manufacturing processes, but the tab portion itself is adhered to the container, which makes initial removal more difficult. In the other Instance design, the tab portion is not adhered to the container, but special openings must be cut out of the booklets during fabrication, which is done off-line and increases manufacturing costs. Thus, there is a need for methods for making laminated resealable booklet label products having unadhered tabs which do not require off-line processes such as cutting out portions of the booklets during fabrication.

OBJECTS OF THE INVENTION

Accordingly, one object of this invention is to provide new and improved laminated resealable booklet labels.

Another object is to provide new and improved methods for making laminated resealable booklet labels having an unadhered pull tab.

SUMMARY OF THE INVENTION

In keeping with one aspect of this invention, a succession of label products are fabricated in succession on an elongated web of release material. Each finished label product includes a self-adhesive base label and a booklet on the base label. The booklet is spaced from a first edge of the base label which is transverse to the direction of the web, and preferably extends over and beyond a second transverse edge of the base label.

A self-adhesive laminate overlays the base label and booklet in a manner which secures the booklet in place over the base label. The laminate extends from the first transverse edge of the booklet to a point which is past both the second transverse edge of the base label and the portion of the booklet which extends beyond the base label. The portion of the laminate which extends past the booklet is secured to the release material during fabrication, and directly to a container in use, up to a first transverse edge of the overhanging portion of the laminate. A laminated paper pull tab extends from a portion of the first transverse laminate edge to a second transverse laminate edge. However, the pull tab is not adhered to the web, or the container, because the paper, which is adhered to the adhesive side of the laminate, does not adhere to the release material or the container. The paper in the pull tab is fabricated from base label stock by deadening or neutralizing the adhesive on the base label material beneath the pull tab during manufacturing.

The label products can be made on a flexo label press from a reel of self-adhesive label stock having pressure-sensitive adhesive label material adhered to a release liner. The label stock is loaded in the press with the release liner up, which is opposite the usual orientation. This orientation allows printing processes to be performed on the adhesive side of the label stock, as will be seen.

The release liner is separated from the label material, and a solution of UV adhesive deadner is applied in a pattern to portions of the adhesive on the label material. The pattern can be applied at a printing station of the press. The dried adhesive deadner solution is then exposed to ultraviolet light, which causes the adhesive deadner to neutralize or deaden the adhesive covered by the solution. The self-adhesive label material is then re-united with the release material, and the label stock is turned over to its usual orientation.

In a first die-cutting operation, a succession of spaced initial bases are created by die-cutting only the self-adhesive label material and removing the waste matrix surrounding the initial bases. The initial bases can be printed on the flexo press if desired.

A pre-fabricated booklet is fed onto each initial base and secured to the web by a web of pressure-sensitive laminate. The booklets can be printed by any suitable method, such as lithography.

The label products are finished in a second die-cutting and waste removal operation. Each finished product includes a base label, a booklet, and a pull tab which is spaced from the base label and booklet. The laminate covers the base label, booklet, pull tab and space between the base label/booklet and the pull tab.

The base label in each label product is formed from one initial base, and the pull tab for each label product is formed from an adjacent initial base. The pull tab is not adhered to the release liner because it is cut from the adhesive deadened portion of the self-adhesive label material.

The finished label products are applied to containers such as bottles using conventional labeling equipment. The base label and the portion of the laminate between the base label/booklet and the pull tab are adhered to the container, but the pull tab is not adhered. Since the pull tab is not adhered to the container, it can be easily lifted and pulled. The portion of the laminate adhered to the container can be pulled off easily, which opens the booklet. The booklet can be resealed by replacing that portion of the laminate on the container.

BRIEF DESCRIPTION OF THE DRAWINGS

The above mentioned and other features of this invention and the manner of obtaining them will become more apparent, and the invention itself will be best understood by reference to the following description of the invention taken in conjunction with the accompanying drawings, in which.

DETAILED DESCRIPTION OF THE INVENTION

Figure 1:
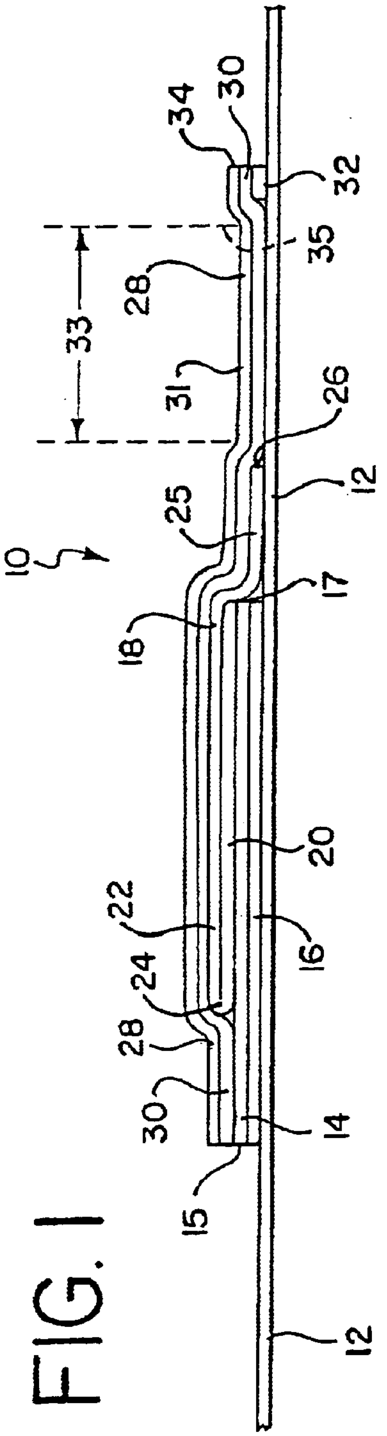
FIG. 1 is a side cross-sectional elevational view of a booklet label product made in accordance with the present invention.

Referring to FIG. 1, a booklet label product 10 is made on a release liner 12. A base label 14 is removably adhered to the release liner by a layer of pressure-sensitive adhesive 16. The base label 14 has a first transverse edge 15 and a second transverse edge 17.

A booklet or leaflet 18 is located over at least part of the base label 14. The booklet label 18 shown in FIG. 1, which is only an example, includes first and second layers 20, 22, and a fold 24. An overhanging booklet portion 25 of the layer 22 extends past the edge 17 of the base label 14, to an end 26. The portion of the booklet between the edge 17 and the end 26 rests directly on the release liner 12. The overhanging booklet portion 25 is not necessary for all applications of this invention, but it is useful when the product is placed on round containers or the like, as will be seen.

A laminate 28 having a layer of pressure-sensitive adhesive 30 extends generally from the edge 15 of the base label 14, and is adhered to a portion of the base label 14 and the booklet 18. An overhanging laminate portion 31 is releasably adhered to the release liner 12 in a space 33 generally between the end 26 and a first transverse laminate edge 35.

A paper pull tab 32 is secured to the laminate 28 between the first laminate transverse edge 35 and a second transverse edge 34 of the laminate 28. The tab 32 rests on the release liner 12, but is not adhered to the release liner.

Figure 2:
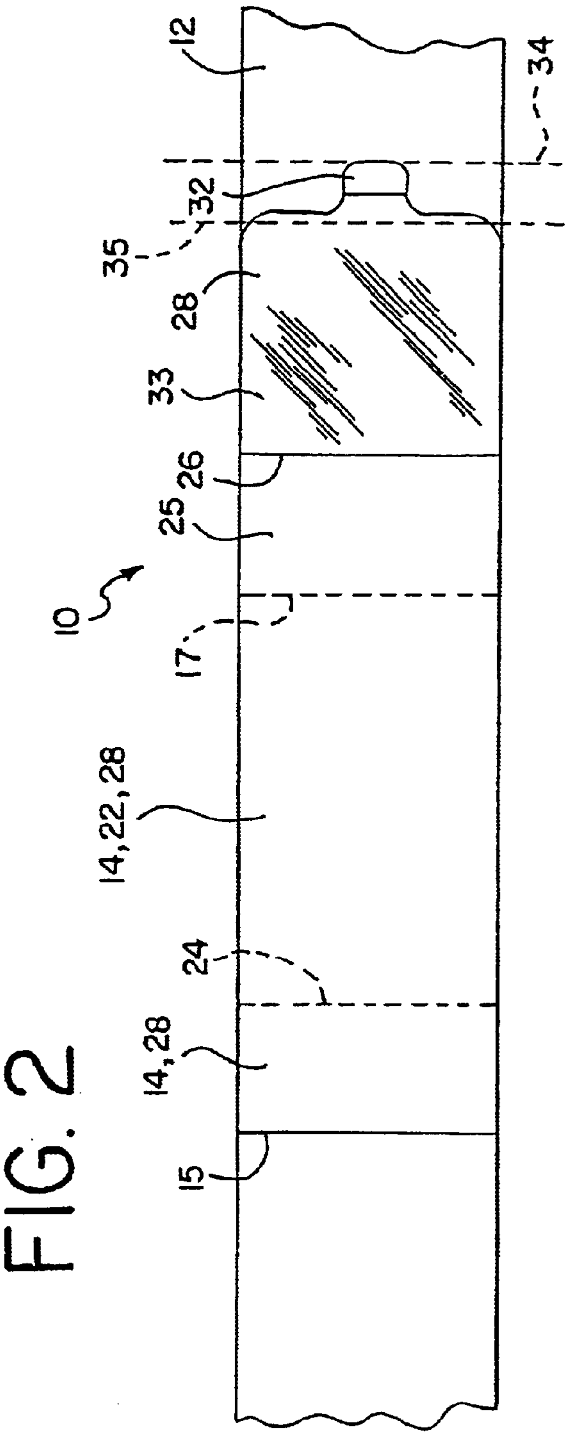
FIG. 2 is a plan view of the label product of FIG. 1.

The booklet label 10 is also shown on the release liner 12 in FIG. 2. The laminate 28 is typically transparent, so the base label 14 can be seen through the laminate 28 near the edge 15. The booklet 22 can also be seen through the laminate, as can the pull tab 32 and release liner in the space 33. The pull tab is generally in the center of the transverse edge of the laminate.

Figure 4:
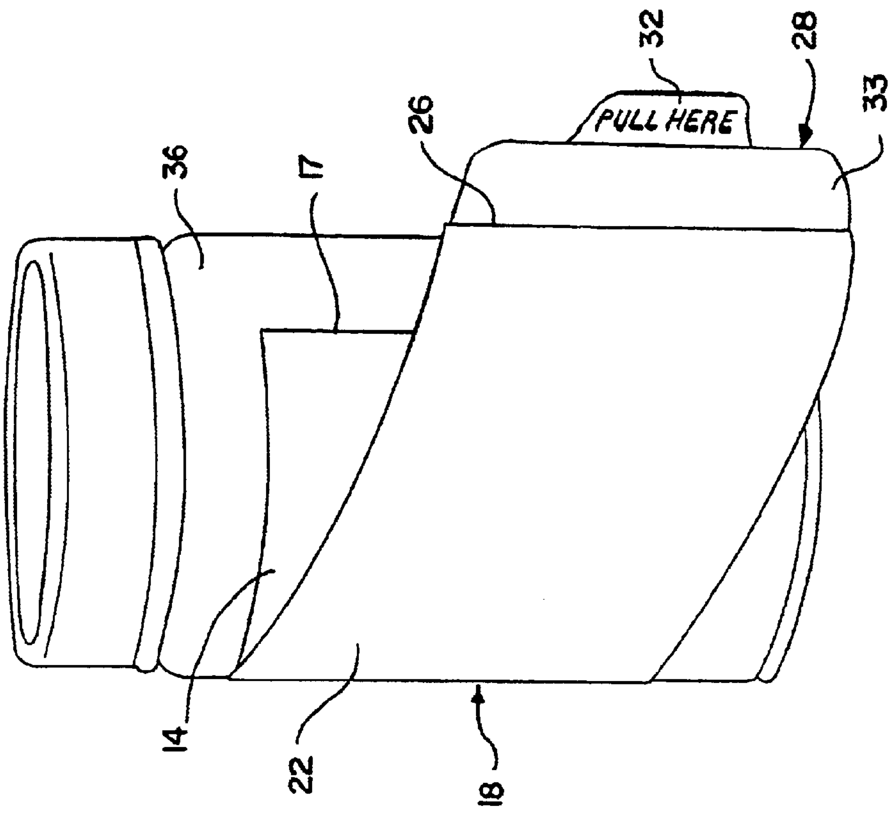
FIG. 4 is a perspective view of the label product and container of FIG. 3, in which the label product is in the open condition.
Figure 3:
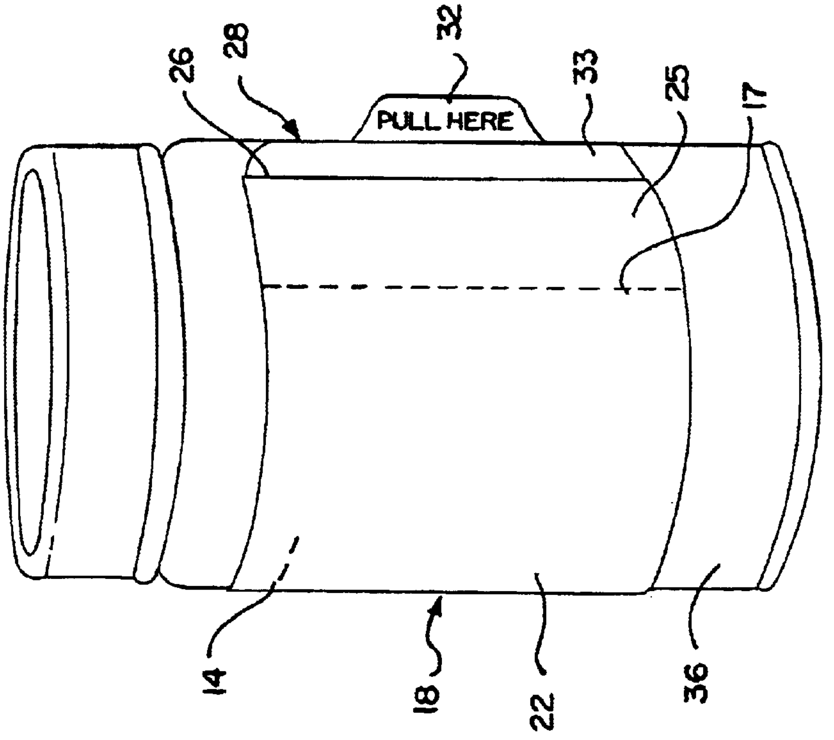
FIG. 3 is a perspective view of the label product of FIG. 1, shown attached to a container and closed.

The booklet label 10 is shown on a container 36 in FIGS. 3 and 4. In FIG. 3, the base label 14 is adhered to the container, and the laminate 28 is also secured to the container in the space 33 between the end 26 of the booklet 18 and the pull tab 32. However, the pull tab 32 is not adhered to the container 36, so it can be readily grabbed and pulled to remove the laminate 28 from the container 36 and open the booklet 18, as seen in FIG. 4.

When the booklet 18 is open, the inside contents of the booklet and any printed matter on the base label can be read. Then, the booklet can be resealed by simply pressing the laminate 28 back onto the container 36. Typically, the booklet 18 can be opened and closed several times in this manner.

The purpose of the overhanging booklet portion 25 can be better understood with reference to FIGS. 3 and 4. When the product 10 is applied to the container 36, the radius of the laminate is greater than the radius of the base label. If the laminate were adhered to base label at the edge 17, as well as the edge 15, the laminate would likely bind. The overhanging booklet portion 25 avoids this binding problem by allowing the laminate to adjust to the radius of the container as needed and adhere to the container correctly.

Figure 5:
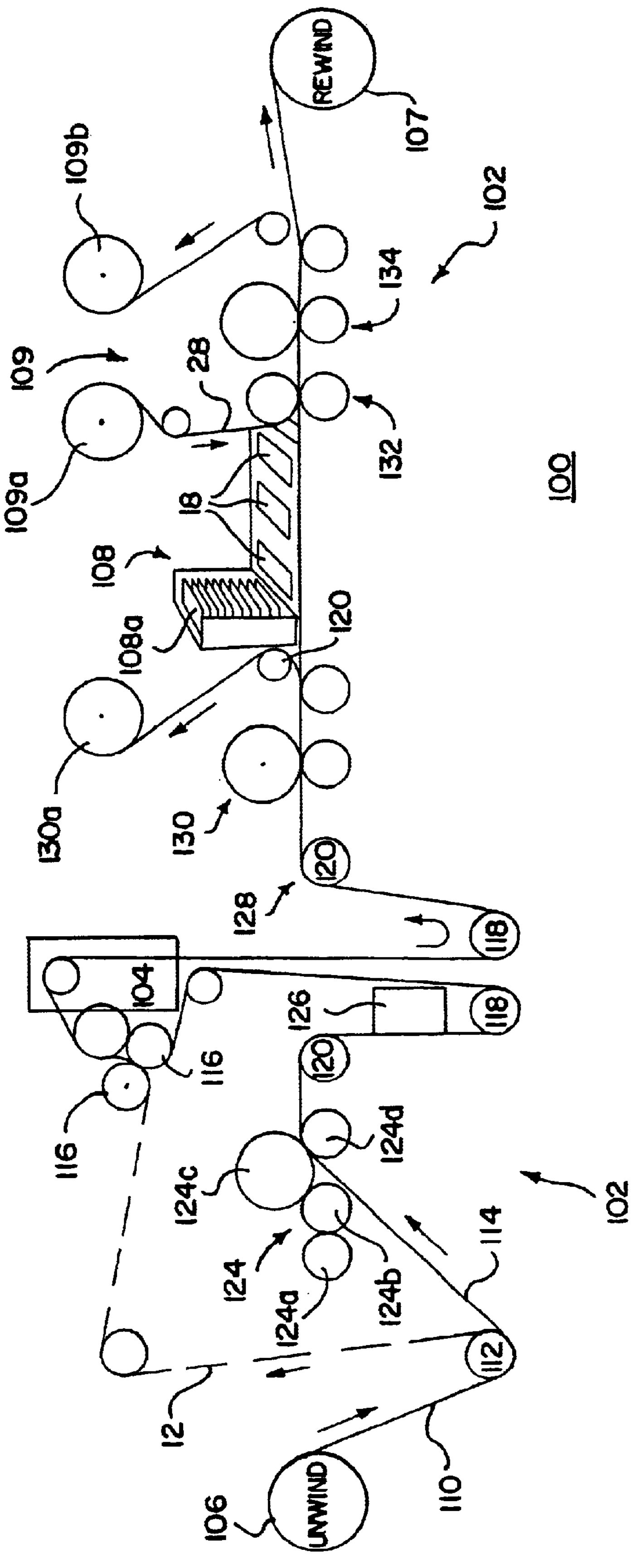
FIG. 5 is a diagram of an apparatus used to make the label product of FIG. 1 in accordance with the method of this invention.

The booklet label 10 is typically mass produced in reel form, using the apparatus shown in FIG. 5. Apparatus 100 generally includes a flexo printing press 102, a turn bar 104, an unwind unit 106, a rewind unit 107, a booklet feeder 108 and a laminating station 109.

The unwind unit 106 is provided with label stock 110, which can be the width of one finished product or several finished products, as will be seen. Label stock 110 is fed to the press with the release material facing up. The release stock 110 is fed to a separator 112 which separates the release liner 12 from pressure-sensitive adhesive label material 114. The release material is drawn directly to rollers 116, where the release material and label material 114 are married together again.

The label material 114 is drawn from the separator 112 over a plurality of rollers 118, 120. At this point in the process, the adhesive side of the material 114 is in contact with the rollers 118, so those rollers are preferably Velcro® or sandpaper idle rollers or the like. The nonadhesive side of the material 14 passes over the rollers 120, so those rollers can be Teflon® coated or aluminum rollers.

Figure 6:
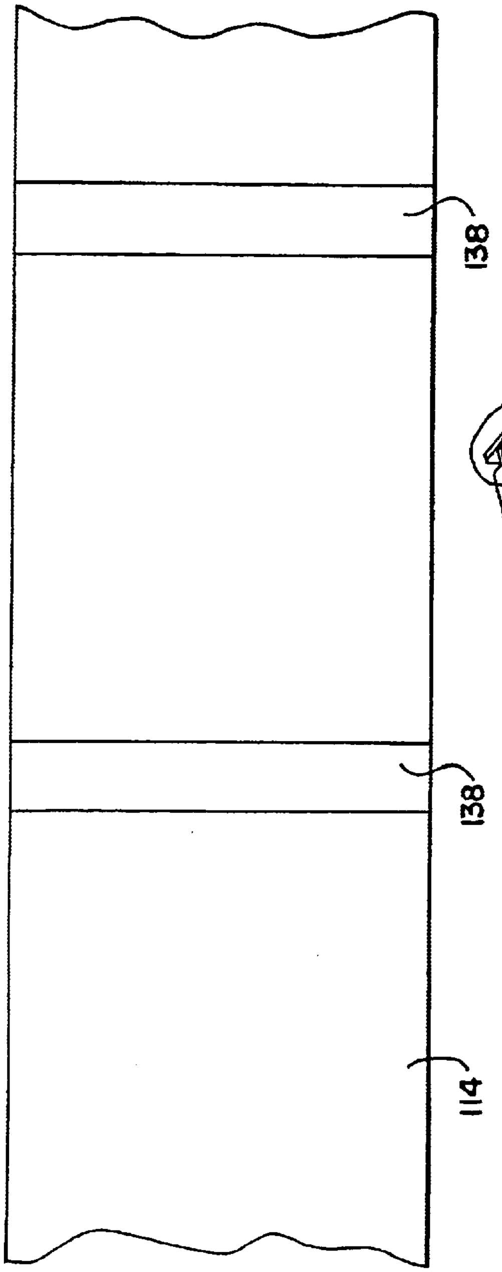
FIG. 6 is a plan view of a pattern of adhesive deadening material on a web of self-adhesive label material.

The press 102 includes a plurality of stations 124, 126, 128, 130, 132, 134, 136. In station 124, an adhesive neutralizing solution such as UV Special Adhesive Deadner No. UV170271, by Environmental Inks & Coating, Ontario, Calif. is applied to the adhesive side of the label material 114 in a pattern of patches 138, such as that shown in FIG. 6. The station 124 includes a meter roller **124*a*, a transfer roller 124*b*, a print roller 124*c*, and an impression roller 124*d*. At least a portion of the paper having the neutralizing solution patches 138 will eventually provide the nonadhesive paper for the pull tabs 32**.

After the station 124, the patches 138 are dried and exposed to ultraviolet light (UV) in a light box 126 (FIG. 5). The ultraviolet light neutralizes the adhesive in the patches where the neutralizing material has been applied. As a result, when the label material 114 is remarried to the release liner 12 at 116, the label material 114 does not adhere to the release liner 12 at the patches 138.

Figure 7:
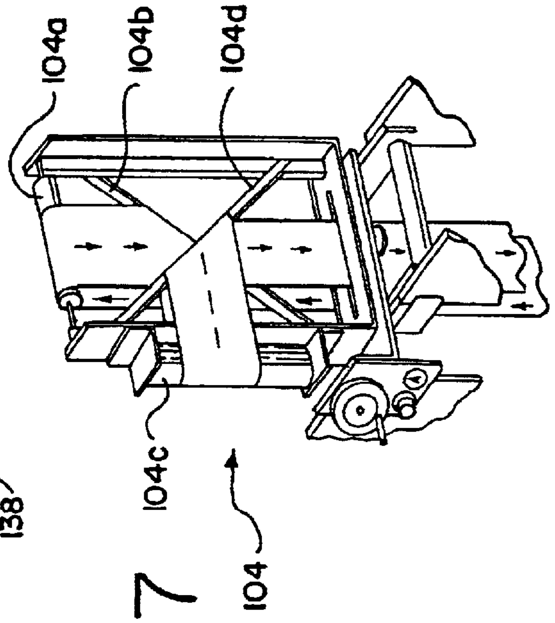
FIG. 7 is a perspective view of a turn bar used in the apparatus of FIG. 5.

The remarried label stock 110 is turned over in the turn bar 104, detailed in FIG. 7. The turn bar 104 includes a plurality of bars **104*a*, 104*b*, 104*c* and 104*d*. The label stock enters the turn bar 104 with the release liner facing up. As it passes over the bars it is turned over so that the label material 114 is facing up. In this manner, the nonadhesive surface of the label material 114** can be printed and processed.

The turned label stock is printed in one or more printing stations 128 and is die cut for the first time in station 130. The resulting waste matrix is wound on a reel **130*a*** and discarded.

Figure 8:
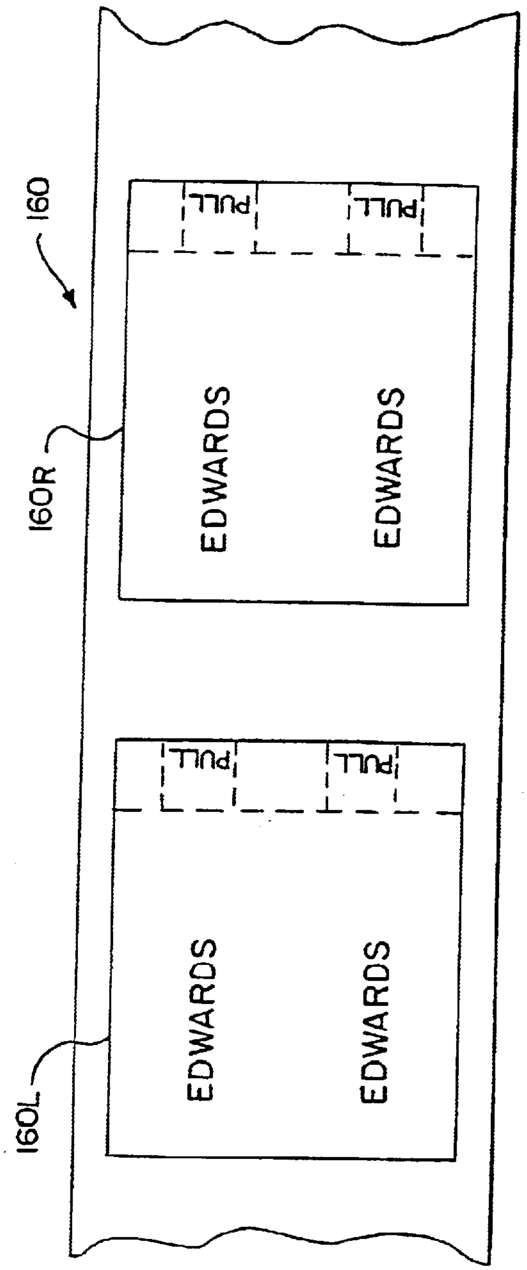
FIG. 8 is a plan view of initial bases die cut from a web of self-adhesive label stock.

The first die-cutting operation creates a succession of initial bases 160, such as bases 160L and 160R in FIG. 8. As will be seen, the pull tabs in the initial base 160L will become part of the booklet label product made from the initial base 160R.

Figure 9:
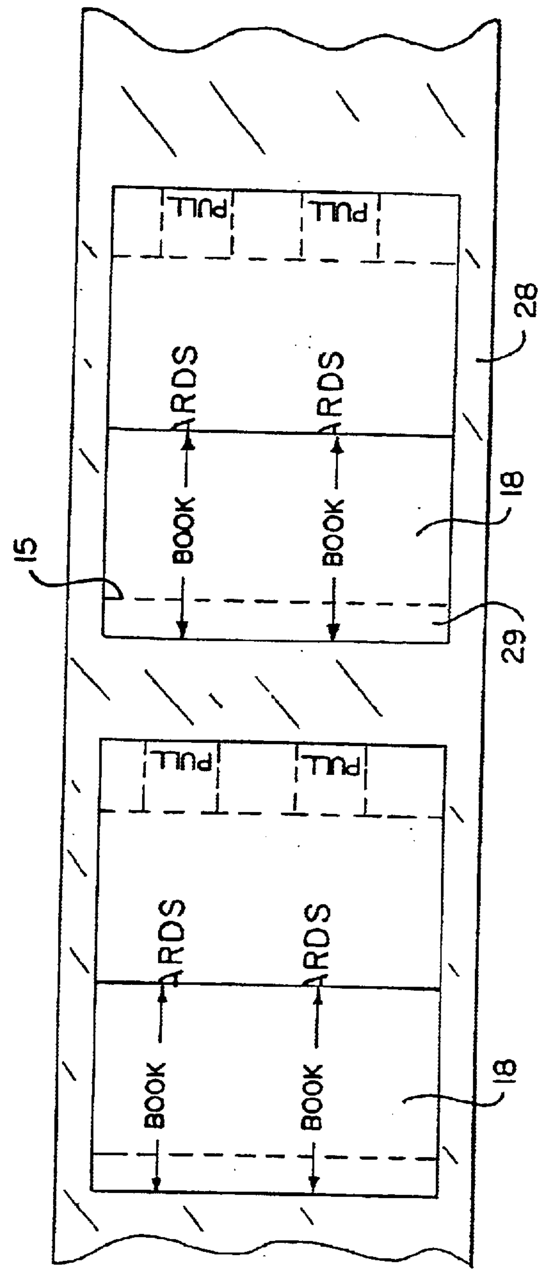
FIG. 9 is a plan view of booklets which have been laminated over the initial bases shown in FIG. 8.

At the station 132 (FIG. 5), booklets 18 are placed on the initial bases 160, preferably without adhesive, and self-adhesive laminate 28 is placed over the initial bases 160 and the booklets 18, as shown in FIG. 9. The booklets can be placed in any appropriate place, but in FIG. 8, the portion 29 extends over the edge 17.

The booklets, which are printed and folded off-line, are fed from a stack 108*a* by a booklet feeder 108. The booklet feeder 108 can be any suitable device, such as an OS 700 feeder/lug conveyor made by On Serts in Scarborough, Ontario Canada. The laminate 28 is drawn from a reel 109*a*.

Figure 10:
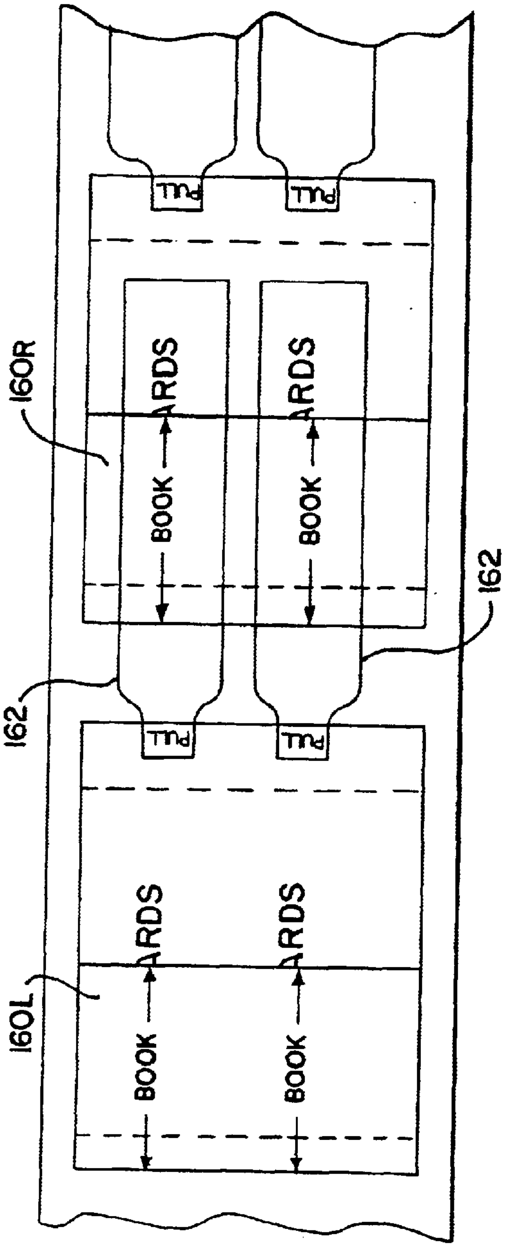
FIG. 10 is a plan view of the web of FIG. 8., showing die cut booklet label products.
Figure 11:
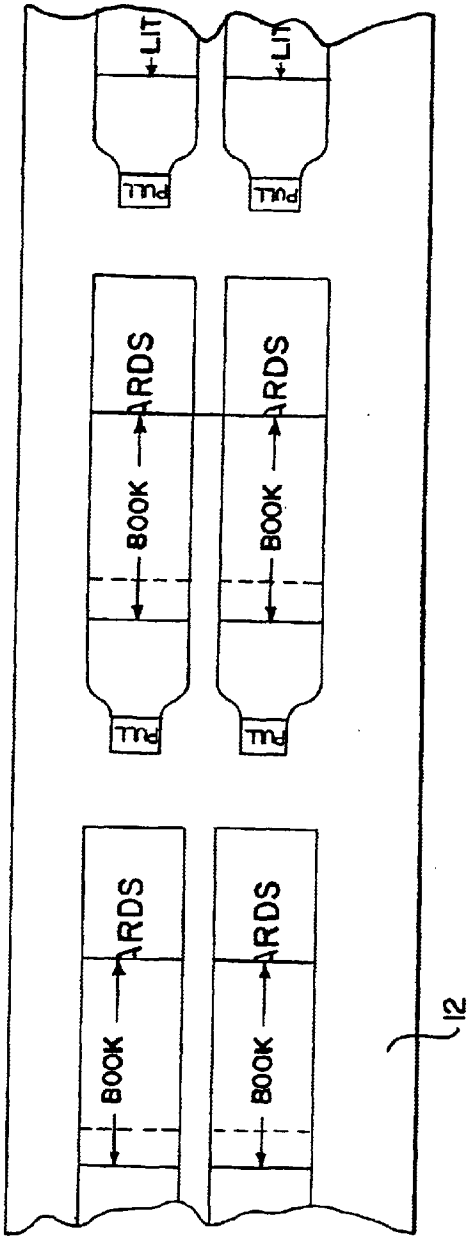
FIG. 11 is another plan view of the web of FIG. 8, showing the finished booklet label products after waste removal.

The second die-cutting station 134 includes die-cutting rollers which die cut the initial bases 160L, 160R in the manner shown in FIG. 10. The die cutting lines 162 outline the booklet label products 110. Among other things, the laminate 28 over the base label 160R also extends over the pull tabs in the base label 160L, as seen in FIG. 11, where the waste matrix has been removed to a reel 109*b*. Since there is no adhesive under the pull tab 32, the pull tab is not adhered to the release liner 12. Also, of course, the pull tab is made of the same type of paper as the base label, and is printed using the same process.

The web of finished label products 10 is wound on a reel in the rewind unit 107. The label stock 110 can be slit longitudinally on-line/off-line as desired. The booklet label products 10 can be applied to bottles or other containers using well known labeling machines.

The many advantages of this invention are now apparent. A laminated resealable booklet label has an unadhered pull tab can be made efficiently.

While the principles of the invention have been described above in connection with a specific apparatus and applications, it is to be understood that this description is made only by way of example and not as a limitation on the scope of the invention.

What is claimed is:

1. A method for making label products comprising:

separating release material from label material in an elongated web of label stock, the label material having pressure-sensitive adhesive on a selected side thereof which faces the release material before separation, neutralizing the pressure-sensitive adhesive in predetermined portions of the label material, reuniting the release material with the adhesive side of the label material, cutting the label material to form a succession of initial bases, without cutting through the release material, the initial bases including the portions of the label material at which the adhesive was neutralized, removing label material outside the initial bases, feeding a printed piece onto each of the initial bases in succession, applying a laminate material having pressure-sensitive adhesive on one side thereof over the web, thereby adhering the laminate material to the initial bases and the printed pieces, and the release liner between adjacent initial bases, and cutting at least the laminate and portions of the initial bases to form a succession of the label products, each label product including a booklet, a base label portion of the initial base which the booklet covers, and a portion of the adjacent initial base which is not adhered to the release liner, the unadhered portion of the adjacent initial base forming a pull tab.

2. The method of claim 1 wherein a portion of the printed pieces extends over a selected edge of the initial bases, the selected edge being transverse to the direction of travel of the web.

3. The method of claim 1 wherein said neutralizing includes applying a solution on the predetermined portions, the solution being reactive to ultraviolet light, and exposing the solution to ultraviolet light to neutralize the adhesive.

* * * * *